US011748723B2

(12) United States Patent
Yoon et al.

(10) Patent No.: US 11,748,723 B2
(45) Date of Patent: Sep. 5, 2023

(54) METHOD AND SYSTEM FOR PROVIDING CONTENTS

(71) Applicant: NAVER WEBTOON LTD., Seongnam-si (KR)

(72) Inventors: Jeong Eun Yoon, Seongnam-si (KR); Ji Hoon Roh, Seongnam-si (KR); Ellie Jieun Park, Seongnam-si (KR); Joon Hyun Kim, Seongnam-si (KR); Hee Jae Ahn, Seongnam-si (KR); Seung Ik Kim, Seongnam-si (KR); Sung Su Park, Seongnam-si (KR); Haeng Seon Kim, Seongnam-si (KR); Ju Young Kim, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 109 days.

(21) Appl. No.: 17/166,275

(22) Filed: Feb. 3, 2021

(65) Prior Publication Data

US 2022/0036327 A1 Feb. 3, 2022

(30) Foreign Application Priority Data

Jul. 31, 2020 (KR) ........................ 10-2020-0095643

(51) Int. Cl.
*G06Q 30/06* (2023.01)
*G06Q 20/12* (2012.01)
(Continued)

(52) U.S. Cl.
CPC ....... *G06Q 20/1235* (2013.01); *G06Q 20/127* (2013.01); *G06Q 30/0623* (2013.01); *H04L 67/306* (2013.01); *H04L 67/54* (2022.05)

(58) Field of Classification Search
CPC ............ G06Q 30/0623; G06Q 20/1235; H04L 67/54
(Continued)

(56) References Cited

U.S. PATENT DOCUMENTS

2003/0135421 A1* 7/2003 Cales .................... G06Q 30/06
705/26.1
2008/0092181 A1* 4/2008 Britt ..................... H04N 21/482
348/E7.071
2008/0301750 A1* 12/2008 Silfvast .............. H04N 21/6125
725/131
(Continued)

FOREIGN PATENT DOCUMENTS

AU 2005263103 A1 * 1/2007 ......... G06F 16/9577
CN 102439986 B * 4/2015 ......... G06Q 30/0601
(Continued)

OTHER PUBLICATIONS

Article, "On-demand pay TV operator plans South Africa debut Anonymous. BBC Monitoring Media [London] May 9, 2011", retrieved on Sep. 7, 2022 from Dialog database (Year: 2011).*
(Continued)

*Primary Examiner* — Yogesh C Garg
(74) *Attorney, Agent, or Firm* — Greer Burns & Crain Ltd.

(57) ABSTRACT

A method for providing contents includes receiving a selection request to view specific contents, from an electronic device; providing a plurality of items corresponding to a plurality of episodes included in the specific contents, in response to the selection request; and performing one of a first process and a second process, related to a provision of the specific episode, according to a product type of the specific episode, in response to a selection of one of the plurality of items through the electronic device.

14 Claims, 20 Drawing Sheets

(51) Int. Cl.
*H04L 67/306* (2022.01)
*G06Q 30/0601* (2023.01)
*H04L 67/54* (2022.01)

(58) Field of Classification Search
USPC ........................................................ 705/26.1
See application file for complete search history.

(56) References Cited

U.S. PATENT DOCUMENTS

| | | | | |
|---|---|---|---|---|
| 2009/0164600 | A1* | 6/2009 | Issa | H04L 65/1094 |
| | | | | 709/215 |
| 2012/0110119 | A1* | 5/2012 | Levicki | H04N 21/8355 |
| | | | | 709/217 |
| 2013/0085944 | A1* | 4/2013 | Fielder | H04L 9/0869 |
| | | | | 705/67 |
| 2013/0174035 | A1* | 7/2013 | Grab | H04N 21/4316 |
| | | | | 715/716 |

FOREIGN PATENT DOCUMENTS

| | | | | | |
|---|---|---|---|---|---|
| EP | 1973292 | A1 * | 9/2008 | | H04L 67/18 |
| JP | 2002074191 | A | 3/2002 | | |
| JP | 2002117658 | A | | 4/2002 | |
| JP | 2003331145 | A | | 11/2003 | |
| JP | 3552515 | B2 * | 8/2004 | | H04N 7/67 |
| JP | 2004535025 | A * | 11/2004 | | G06Q 20/10 |
| JP | 2005235170 | A | | 9/2005 | |
| JP | 2010108391 | A * | 5/2010 | | G06F 13/00 |
| JP | 2017529577 | A | | 10/2017 | |
| KR | 1020180119005 | A | | 11/2018 | |
| KR | 1020200028132 | A | | 3/2020 | |

OTHER PUBLICATIONS

Manzo, Michael. "TV-Everywhere software"; Broadcast Engineering54. 1: NA. Penton Media, Inc., Penton Business Media, Inc. and their subsidiaries. (Jan. 1, 2012); retrieved from Dialog on Dec. 28, 2022 (Year: 2012).*

Office action issued in JP application No. 2020-161466, dated Jan. 31, 2023.

Naver Blog; "Tips for reading free books, webtoons, and web novels on Kakao Page"; Feb. 22, 2019.

Office action issued in corresponding Korean patent application No. 10-2020-0095643, dated Jun. 21, 2023.

* cited by examiner

FIG. 3B

| ○ SELECTION OF EPISODE TO WHICH VIEWING RIGHT IS APPLIED | | | | | |
|---|---|---|---|---|---|
| EPISODE NUMBER | EPISODE NUMBER | UPLOADED STATE | EXPOSURE DATE | CORRECTION DATE | SELECTION |
| 1 | Ep.1 | UNDER SERVICE | 2019.01.08 11:00 | 2019.01.08 11:00 | [SELECTION] |
| 2 | Ep.2 | UNDER SERVICE | 2019.01.08 11:00 | 2019.01.08 11:00 | [SELECTION] |
| 3 | Ep.3 | UNDER SERVICE | 2019.01.08 11:00 | 2019.01.08 11:00 | [SELECTION] |
| 4 | Ep.4 | UNDER SERVICE | 2019.01.08 11:00 | 2019.01.08 11:00 | [SELECTION] |
| 5 | Ep.5 | UNDER SERVICE | 2019.01.08 11:00 | 2019.01.08 11:00 | [SELECTION] |
| 6 | Ep.6 | UNDER SERVICE | 2019.01.08 11:00 | 2019.01.08 11:00 | [SELECTION] |
| 7 | Ep.7 | UNDER SERVICE | 2019.01.08 11:00 | 2019.01.08 11:00 | [SELECTION] |
| 8 | Ep.8 | UNDER SERVICE | 2019.01.08 11:00 | 2019.01.08 11:00 | [SELECTION] |
| 9 | Ep.9 | UNDER SERVICE | 2019.01.08 11:00 | 2019.01.08 11:00 | [SELECTION] |
| 10 | Ep.10 | UNDER SERVICE | 2019.01.08 11:00 | 2019.01.08 11:00 | [SELECTION] |
| 10 | Ep.11 | UNDER SERVICE | 2019.01.08 11:00 | 2019.01.08 11:00 | [SELECTION] |
| 10 | Ep.12 | UNDER SERVICE | 2019.01.08 11:00 | 2019.01.08 11:00 | [SELECTION] |

1 2 3 4 5 6 7 8 9 10 > >>

SELECTED EPISODE NUMBER : 5     [RELEASE OF SELECTION] [STORAGE]

FIG. 6

| NOVEMBER 13 | | NOVEMBER 13 | | NOVEMBER 15 | |
|---|---|---|---|---|---|
| 0:00 | | 0:00 | | 0:00 | 17:59 left |
| 1:00 | | 1:00 | | 1:00 | 16:59 left |
| 2:00 | | 2:00 | | 2:00 | 15:59 left |
| 3:00 | | 3:00 | | 3:00 | 14:59 left |
| 4:00 | | 4:00 | | 4:00 | 13:59 left |
| 5:00 | | 5:00 | | 5:00 | 12:59 left |
| 6:00 | | 6:00 | | 6:00 | 11:59 left |
| 7:00 | | 7:00 | | 7:00 | 10:59 left |
| 8:00 | | 8:00 | | 8:00 | 09:59 left |
| 9:00 | | 9:00 | 1 day(s) left | 9:00 | 08:59 left |
| 10:00 | | 10:00 | | 10:00 | 07:59 left |
| 11:00 | | 11:00 | | 11:00 | 06:59 left |
| 12:00 | 2 day(s) left | 12:00 | | 12:00 | 05:59 left |
| 13:00 | | 13:00 | | 13:00 | 04:59 left |
| 14:00 | | 14:00 | | 14:00 | 03:59 left |
| 15:00 | | 15:00 | | 15:00 | 02:59 left |
| 16:00 | | 16:00 | | 16:00 | 01:59 left |
| 17:00 | | 17:00 | | 17:00 | 00:59 left |
| 18:00 | | 18:51 | 23:59 left | 18:50 | Unlock or Sale Price |
| 19:00 | | 19:50 | 22:59 left | 19:00 | |
| 20:00 | | 20:50 | 21:59 left | 20:00 | |
| 21:00 | | 21:50 | 20:59 left | 21:00 | |
| 22:00 | | 22:50 | 19:59 left | 22:00 | |
| 23:00 | | 23:50 | 18:59 left | 23:00 | |

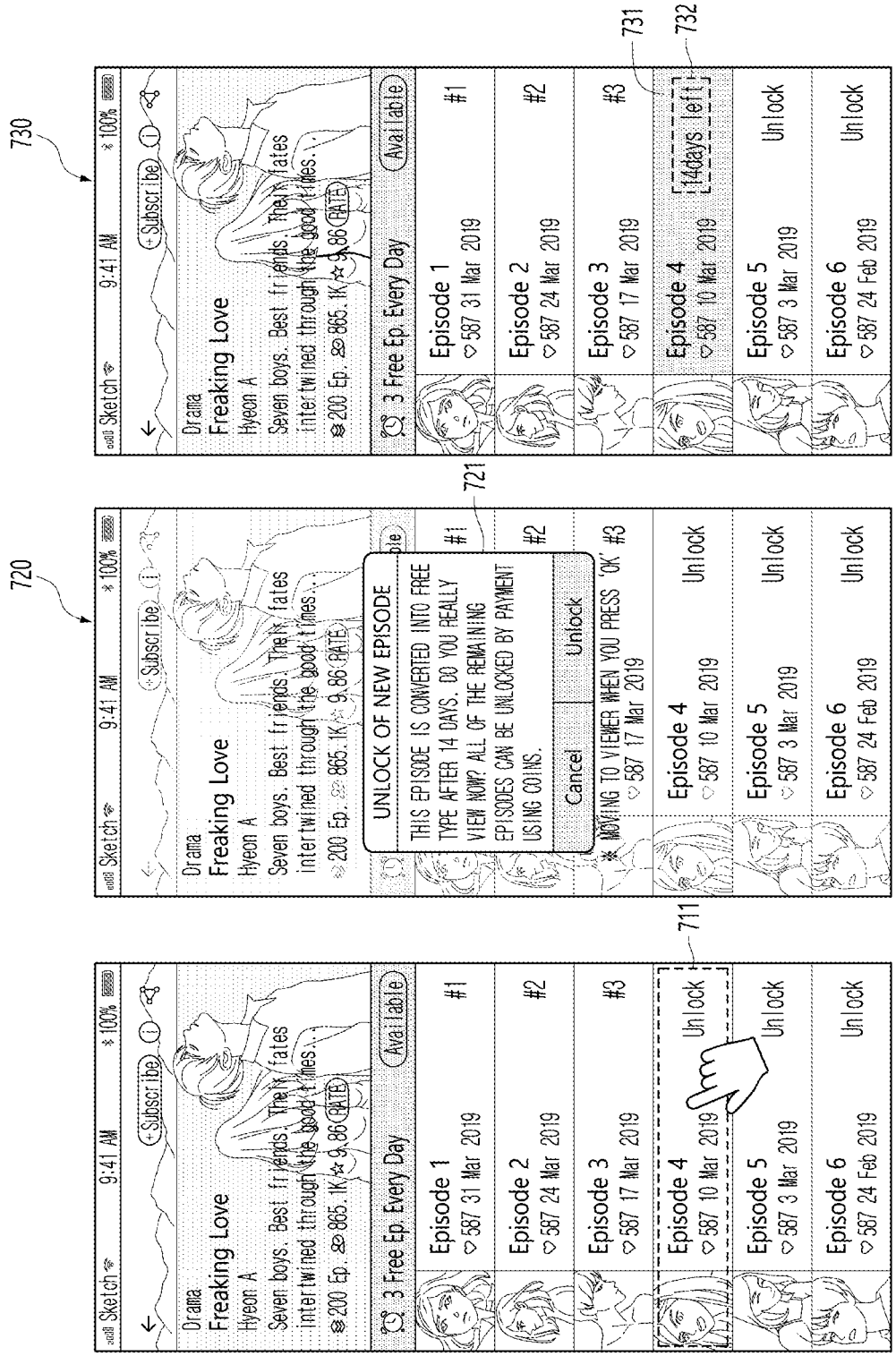

| BUNDLE SALE - OPTION 1 | | |
|---|---|---|
| USED OR NOT | Y ▼ | |
| BUNDLE UNIT (EPISODE NUMBER) | 50 | MAXIMUM 100 ARE AVAILABLE |
| MINIMUM EPISODE NUMBER | 20 | |
| DISCOUNT PRICE OF ONE EPISODE (COIN) | 3 | |
| DISCOUNT RATE (%) | 25% | |
| FINAL SALE PRICE (Coin) | 60~150 | |

| BUNDLE SALE - OPTION 2 | | |
|---|---|---|
| USED OR NOT | N ▼ | |
| BUNDLE UNIT (EPISODE NUMBER) | | MAXIMUM 100 ARE AVAILABLE |
| MINIMUM EPISODE NUMBER | | |
| DISCOUNT PRICE OF ONE EPISODE (COIN) | | |
| DISCOUNT RATE (%) | | |
| FINAL SALE PRICE (COIN) | | | ns.
METHOD AND SYSTEM FOR PROVIDING CONTENTS

CROSS-REFERENCE TO RELATED APPLICATION

Pursuant to 35 U.S.C. § 119(a), this application claims the benefit of the earlier filing date and the right of priority to Korean Patent Application No. 10-2020-0095643, filed on Jul. 31, 2020, the contents of which are incorporated by reference herein in their entirety.

BACKGROUND OF THE INVENTION

1. Technical Field

The present disclosure relates to a method and system for providing contents.

2. Description of the Related Art

As technologies develop, utilization of digital devices is actively ongoing. Especially, electronic devices (e.g., a smart phone, a tablet PC, etc.) are provided with various functions such as web surfing using the Internet, music appreciation, and viewing of video contents, as well as a communication function such as a calling or a transmission/reception of text messages.

Owing to the popularization of such electronic devices, consumption of contents is rapidly increased. As a representative example of such contents, there is a WEBTOON.

A webtoon is a cartoon uploaded and spread through an Internet communication network, and is a compound word of a web and a cartoon.

As the consumption of such webtoon is steadily increased, various providers (or webtoon-related service providers) are developing various services in order to obtain users (consumers or readers) who can steadily use services of the providers.

For instance, Korean Laid-Open Patent No. 10-2018-0119005 (a webtoon providing method using a replay function) discloses a method for allowing a user to purchase a webtoon of desired contents, by allowing a user who possesses a webtoon online to permit a replay function to other users, and thereby allowing a user who has viewed a part of the webtoon to select for purchase.

Such a method is advantageous in attracting new users, but has a limitation in obtaining steady users who can use services.

Accordingly, there exist needs to obtain users who can steadily consume contents, and to increase consumption of contents.

BRIEF SUMMARY OF THE INVENTION

Therefore, an aspect of the present disclosure is to provide a method and system for providing contents, capable of inducing continuous consumptions of contents.

Another aspect of the present disclosure is to provide a method and system for providing contents, capable of allowing a user to access charged contents more easily.

Another aspect of the present disclosure is to provide a method and system for providing contents, capable of allowing a user to consume contents more economically, by providing a method for using charged contents in which a user is interested, for free.

Another aspect of the present disclosure is to provide a method and system for providing contents, capable of preventing a user from unnecessarily wasting money in using charged contents.

In order to achieve these and other advantages and in accordance with the purpose of this specification, as embodied and broadly described herein, there is provided a method for providing contents, including: receiving a selection request to view specific contents, from an electronic device; providing a plurality of items corresponding to a plurality of episodes included in the specific contents, in response to the selection request; in response to a selection of one of the plurality of items through the electronic device, determining a product type of a specific episode corresponding to the one item; and performing one of a first process and a second process, related to a provision of the specific episode, according to the product type of the specific episode.

Here, the first process may include a process of providing the specific episode to the electronic device. And the second process may include a process of determining whether a specific user account which has been logged in through the electronic device has a viewing right with respect to the specific episode.

The product type of the specific episode may be one of a free product type and a charged product type.

In the method for providing contents according to the present disclosure, when the specific episode has a free product type, the first process may be performed. Here, the first process may be performed to provide the specific episode to the electronic device, without determining whether the specific user account has a viewing right with respect to the specific episode.

In the method for providing contents according to the present disclosure, when the specific episode has a charged product type, the second process may be performed. Here, the second process may further include a process of providing the specific episode to the electronic device, in a case that the specific user account has a viewing right with respect to the specific episode as a result of the determination.

The second process may further include a process of subtracting the number of times of availability of the charged episode viewing right allocated to the specific user account, based on the provision of the specific episode.

There is also provided a system for providing contents, including: a communication unit configured to receive a selection request for specific contents, from an electronic device; a storage unit configured to store a plurality of episodes included in the specific contents; and a controller configured to control the communication unit such that a plurality of items corresponding to the plurality of episodes are provided to the electronic device, in response to the selection request. Here, in response to a selection of one of the plurality of items through the electronic device, the controller may determine a product type of a specific episode corresponding to the one item, and may perform one of a first process and a second process, related to a provision of the specific episode, according to the product type of the specific episode.

Here, the first process may include a process of providing the specific episode to the electronic device. The second process may include a process of determining whether a specific user account which has been logged in through the electronic device has a viewing right with respect to the specific episode.

There is also provided a method for providing contents, using an application executed on an electronic device, the method including: selecting specific contents through an execution screen of the application, the execution screen being outputted to the electronic device; and outputting a plurality of items corresponding to a plurality of episodes included in the specific contents, based on the selection of the specific contents.

Here, in the outputting of the plurality of items, notification information related to a charged episode viewing right which can view charged episodes among the plurality of episodes may be output together with the plurality of items.

In the method for providing contents which uses an application executed on an electronic device, information on the charged episode viewing right may include the remaining number of times of availability of the charged episode viewing right retained at a user account which has been logged in through the electronic device.

As aforementioned, in the method and system for providing contents according to the present disclosure, a viewing right for viewing charged contents may be allocated to a user account. A user who has received such a viewing right may view charged contents by using the viewing right. This may prevent the user from unnecessarily paying for the charged contents.

In the method and system for providing contents according to the present disclosure, a viewing right is set to be available only within a preset time based on an allocation time of the viewing right. This may induce a user to consume charged contents by using the viewing right within the preset time.

In the method and system for providing contents according to the present disclosure, since a viewing right is reallocated per preset time period, a user may consume charged contents within a preset time, and may be induced to continuously consume the charged contents through the reallocated viewing right. Consequently, in the method and system for providing contents according to the present disclosure, a user who can consume contents steadily can be obtained, through a viewing right allocated per preset time period and available only within a preset time.

Further, in the method and system for providing contents according to the present disclosure, when a viewing right is reallocated, information on contents which have been previously viewed by a user is provided to the user. This may effectively induce the user to consume contents.

In the method and system for providing contents according to the present disclosure, when a user is to purchase charged contents, information on a time when the charged contents are converted into free contents is provided. This may prevent the user from unnecessarily consuming the charged contents.

BRIEF DESCRIPTION OF THE DRAWINGS

FIGS. 3A and 3B are conceptual views for explaining a method for specifying contents for which a charged episode viewing right can be used, in a method and system for providing contents according to the present disclosure.

FIGS. 4A to 4D, FIGS. 5A to 5E, and FIG. 6 are conceptual views for explaining a viewing right by which a charged episode can be viewed, in a method and system for providing contents according to the present disclosure.

FIGS. 7A to 7G are conceptual views for explaining a method for guiding information on a time to convert charged contents into free contents, in a method and system for providing contents according to the present disclosure.

FIGS. 8A and 8B are conceptual views for explaining a method for inducing a user to consume more economically at the time of purchasing charged contents, in a method and system for providing contents according to the present disclosure.

DETAILED DESCRIPTION OF THE INVENTION

Figure 1:
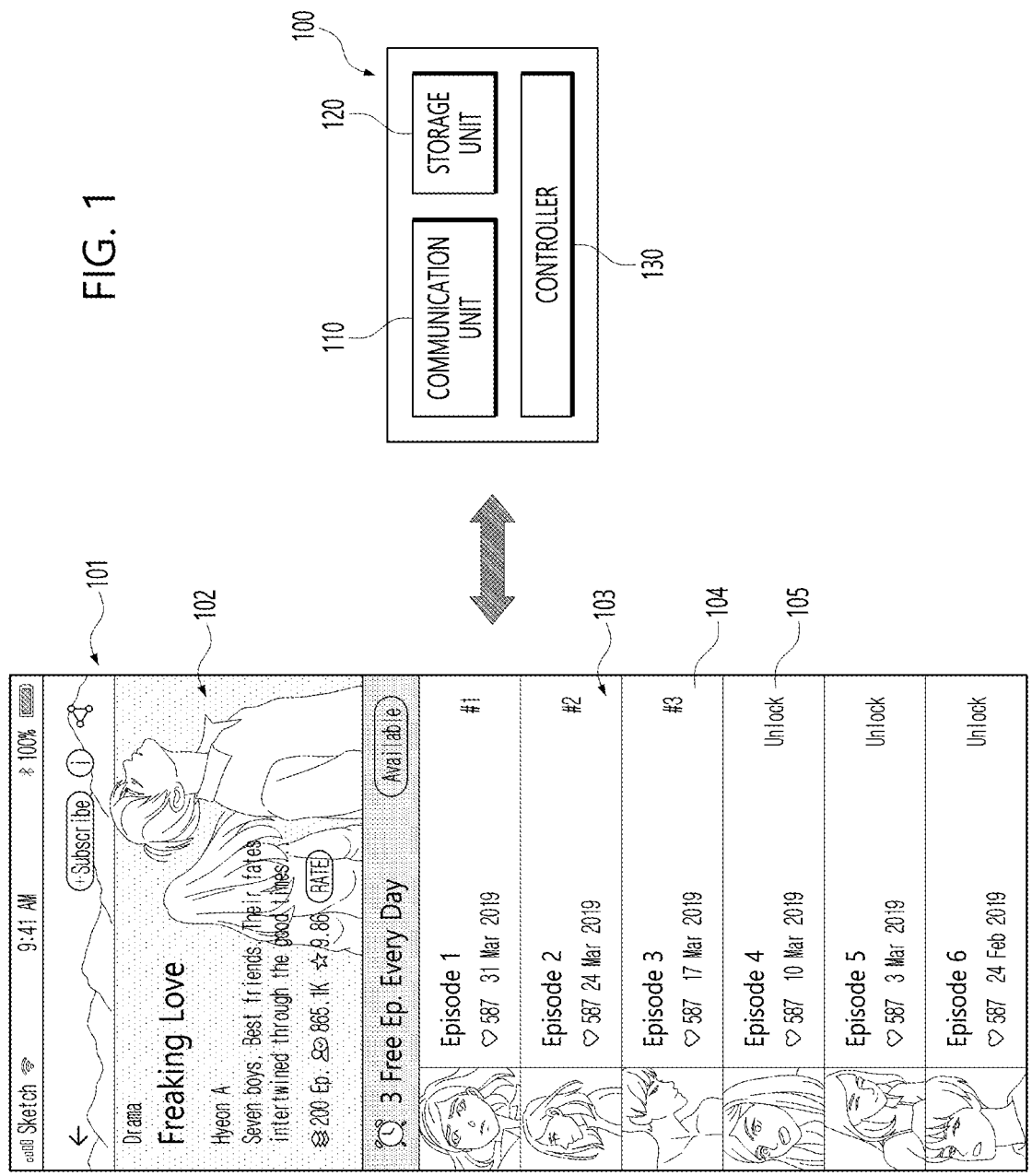
FIG. 1 is a conceptual view for explaining a method and a system for providing contents according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

The present disclosure relates to a method and system for providing contents, and may provide a user interface (a user environment) which allows a user to access charged contents more easily, and to use contents continuously.

The system for providing contents explained in the present disclosure may be configured as a system for providing at least one contents among various types of contents.

The type of contents to which the present disclosure can be applied may be variable. For instance, at least one of contents such as a webtoon, music, an e-book, moving images and still images may be provided in the present disclosure.

Hereinafter, for convenience, the contents corresponding to a webtoon will be explained. Here, the webtoon, a compound word of a web and a cartoon, means a cartoon or a comic strip provided through an Internet communication network.

Such contents corresponding to a webtoon (hereinafter, will be referred to as 'webtoon contents') may be provided to an electronic device through a method and system for providing contents according to the present disclosure. Thus, a user may use webtoon contents provided through a method and system for providing contents according to the present disclosure, through an electronic device.

The webtoon contents of the present disclosure may consist of a plurality of sub contents. Such plurality of sub contents may constitute series of the webtoon contents.

Here, the series may mean consecutive planned contents.

In the present disclosure, the 'sub contents' will be referred to as 'episodes', in order to prevent confusion of terms of the webtoon contents and the sub contents.

Figure 2:
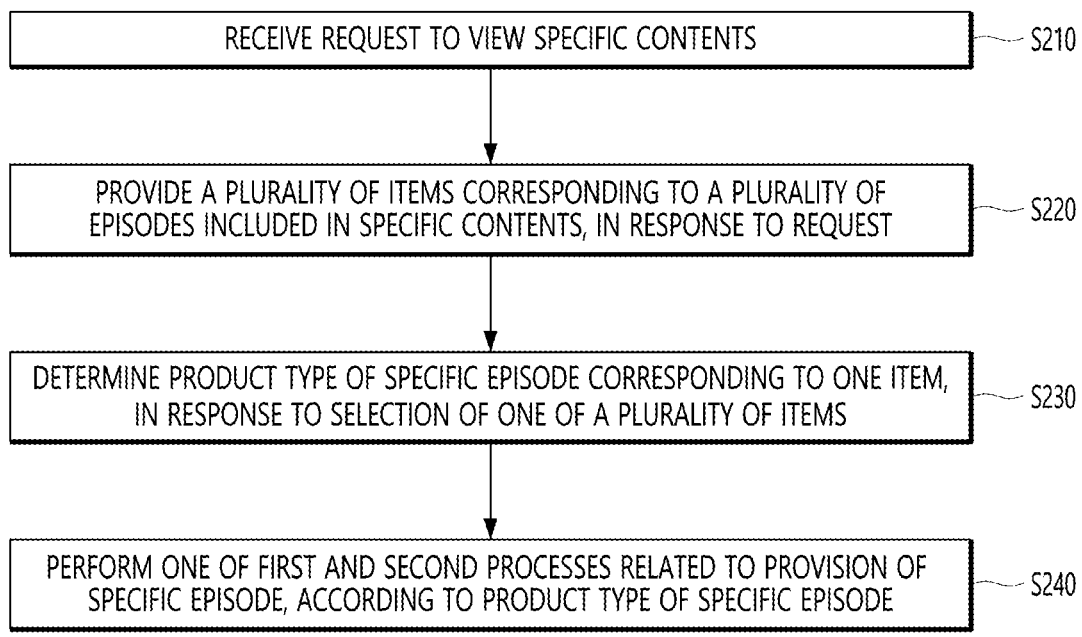
FIG. 2 is a flowchart for explaining a method for providing contents according to the present disclosure.

Hereinafter, a method and system for providing contents, which provide the aforementioned webtoon contents which consist of a plurality of episodes will be explained in more detail with reference to the attached drawings. FIG. 1 is a conceptual view for explaining a method and system for providing contents according to the present disclosure, and FIG. 2 is a flowchart for explaining a method for providing contents according to the present disclosure.

As shown in FIG. 1, a system 100 for providing contents may include at least one of a communication unit 110, a storage unit 120 and a controller 130.

Here, the communication unit 110 may provide (transmit) webtoon contents to an electronic device 101, via a wired or wireless communication.

Here, the electronic device 101 may be an electronic device used by a user, and its type is not limited to a specific one if the electric device can provide webtoon contents provided through the contents providing system of the present disclosure.

For instance, the electronic device 101 may be implemented as a mobile terminal, a smart phone, a notebook computer, a laptop computer, a slate PC, a tablet PC, an ultra book, a desktop computer, a digital broadcast terminal, a personal digital assistant (PDA), a portable multimedia player (PMP), a navigator, a wearable device (for example, a smart watch, smart glasses, a head mounted display (HMD)), and the like.

The storage unit 120 may be configured to store various information related to provision of webtoon contents. The storage unit 120 may include at least one contents database (DB) including a plurality of webtoon contents.

The storage unit 120 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

Further, the storage unit 120 may store information on a user who has subscribed to a service provided in the contents providing system of the present disclosure (e.g., a webtoon contents providing system). Such user information may include information on a user account (e.g., identification (ID)). A user may use webtoon contents by logging in a service provided in the contents providing system 100 of the present disclosure with a user account.

The controller 130 may perform a series of controls for providing webtoon contents to the electronic device 101.

The controller 130 may be implemented using any type of device capable of processing data, such as a processor. Here, the processor may refer to a hardware built-in data processing device having a circuit physically structured to perform functions expressed in codes or instructions included in computer programs. Examples of the hardware built-in data processing device may include processing devices such as a microprocessor, a central processing unit (CPU), a processor core, a multiprocessor, an application-specific integrated circuit (ASIC), a field programmable gate array (FPGA), etc.

Firstly, as shown in FIG. 1, if a request to view specific contents (e.g., specific webtoon contents) is received from the electronic device 101 through the communication unit 110, the controller 130 may provide, to the electronic device, list information corresponding to a plurality of episodes included in the selected specific contents 102 (e.g., contents having a title of 'Freaking Love').

More specifically, the communication unit 110 may transmit the list information to the electronic device 101, under control of the controller 130.

In the contents providing method of the present disclosure, a process of receiving a request to view specific contents from the electronic device 101 (S210) may be performed.

As aforementioned, the viewing request may be understood as an operation to select specific contents on the electronic device.

Next, in the contents providing method of the present disclosure, a process may be performed of providing a plurality of items corresponding to a plurality of episodes included in the specific contents, in response to the viewing request (S220).

As shown in FIG. 1, the controller 130 may provide a list 103 including a plurality of items 104, 105 corresponding to a plurality of episodes included in the specific contents, based on the viewing request, to the electronic device 101.

Thus, as shown in FIG. 1, the list 103 (or episode list) including the plurality of items 104, 105 corresponding to the plurality of episodes may be output to the user's electronic device 101.

The controller 130 may transmit information retained at the storage unit 120 to the electronic device 101 through the communication unit 110, such that the list 103 is output to the electronic device.

Further, if one of the plurality of items 104, 105 is selected from the electronic device 101, the controller 130 may perform a series of processes for providing an episode corresponding to the selected item (hereinafter, an episode corresponding to a selected item will be referred to as a 'specific episode' for convenience), to the electronic device.

Here, the 'selection of one item' may be understood as reception of 'a request to view a specific episode' corresponding to the one item, from the electronic device.

In response to the selection of one item, the controller 130 may control the storage unit 120 and the communication unit 110, such that information on a specific episode retained at the storage unit 120 is transmitted to the electronic device 101 through the communication unit 110.

In the process of providing the specific episode to the electronic device, the controller 130 may perform a different process according to a product type of the specific episode.

More specifically, in the contents providing method of the present disclosure, in response to selection of one of a plurality of items 104, 105 included in the list 103, a process of determining a product type of a specific episode corresponding to the one item (S230) may be performed.

Here, the product type of the episode may be one of a 'free product type' and a 'charged product type'.

'An episode of a free product type' may mean an episode immediately viewed (or used) by a user without payment of electronic money, coupons or a viewing right (or a use right).

Here, the electronic money is currency that is stored in banking computer systems. In the present invention, the electronic money may be any means capable of online payment, and there is no particular limitation on its type.

In contrast, 'an episode of a charged product type' may mean an episode viewed (or used) by a user after payment of electronic money, coupons or a viewing right (or a use right).

In the contents providing method of the present disclosure, if a product type of a specific episode is determined, one of a plurality of processes related to provision of the specific episode may be performed according to the product type of the specific episode (S240).

For instance, according to the product type of the specific episode, the controller 130 may provide the episode without an additional payment process (i), or may perform a payment process (ii).

For instance, when the product type of the specific episode is a free product type, the controller 130 may provide the specific episode to the electronic device 101, based on a selection of an item 104, 105 corresponding to the specific episode on the electronic device.

That is, when the product type of the specific episode is a free product type, the controller 130 may perform a process of providing the specific episode to the electronic device 101, without determining whether a user account has a viewing right with respect to the specific episode. In the present disclosure, such a process may be referred to as 'first process'.

In the present disclosure, 'providing an episode to an electronic device' may mean sending information related to an episode to the electronic device 101, such that contents corresponding to the episode are output to the electronic device.

In the case of an episode being a free product type, the controller 130 may provide a specific episode only to an electronic device used to log in to a user account pre-registered to the contents providing system 100 of the present disclosure.

For instance, if a request to view an episode having a free product type is received from the electronic device 101, the controller 130 may check whether a user account has been logged in through the electronic device. After checking that the user account has been logged in through the electronic device, the controller 130 may provide the episode having a free product type to the electronic device 101. Here, if no user account has been logged in through the electronic device 101, the controller 130 may execute a process of performing a log-in.

If a specific episode is a charged product type, the controller 130 may perform a process of determining a use right (or a viewing right) of a user account which has been logged in through the electronic device 101, based on a selection of an item 104, 105 corresponding to the specific episode on the electronic device. In the present disclosure, such a process may be referred to as 'second process'.

Here, the determining a use right (or a viewing right) may be understood as determining whether a specific user account which has been logged in through the electronic device has a right to use (or view) the specific episode.

Meanwhile, 'a user account has a right to use (or view) an episode' may be understood as that 'a user account has electronic money, coupons or a viewing right (a use right) which can be used (or paid) for an episode.

For instance, if a specific episode of a charged product type is selected, the controller 130 may perform a payment process of paying electronic money (i), using coupons (ii), or using (subtracting) a viewing right (iii), the electronic money, the coupons and the viewing right which are retained at a user account.

The controller 130 may provide a specific episode of a charged product type, to a user account which has completed to pay for a right to view (or use) a charged episode, through such a payment process.

In the contents providing system 100 of the present disclosure, an episode of which viewing has been requested by a user may be provided through a different process, according to a charged or free product type.

As aforementioned, in order to use an episode of a charged product type, a user is required to pay electronic money, or use pre-possessed (retained) coupons or viewing rights (use rights).

In the case of paying electronic money for a charged episode, a user may feel a burden economically or psychologically. Thus, the present disclosure provides a method capable of allowing a user to freely use an episode of a charged product type through a 'viewing right' for viewing an episode of a charged product type, and capable of allowing a user to continuously use contents.

Hereinafter, for convenience, 'an episode of a charged product type' will be referred to as 'a charged episode'. Further, 'a viewing right for viewing a charged episode', which is to be explained later, will be referred to as 'a charged episode viewing right'.

Figure 3A:
Figure 3C:
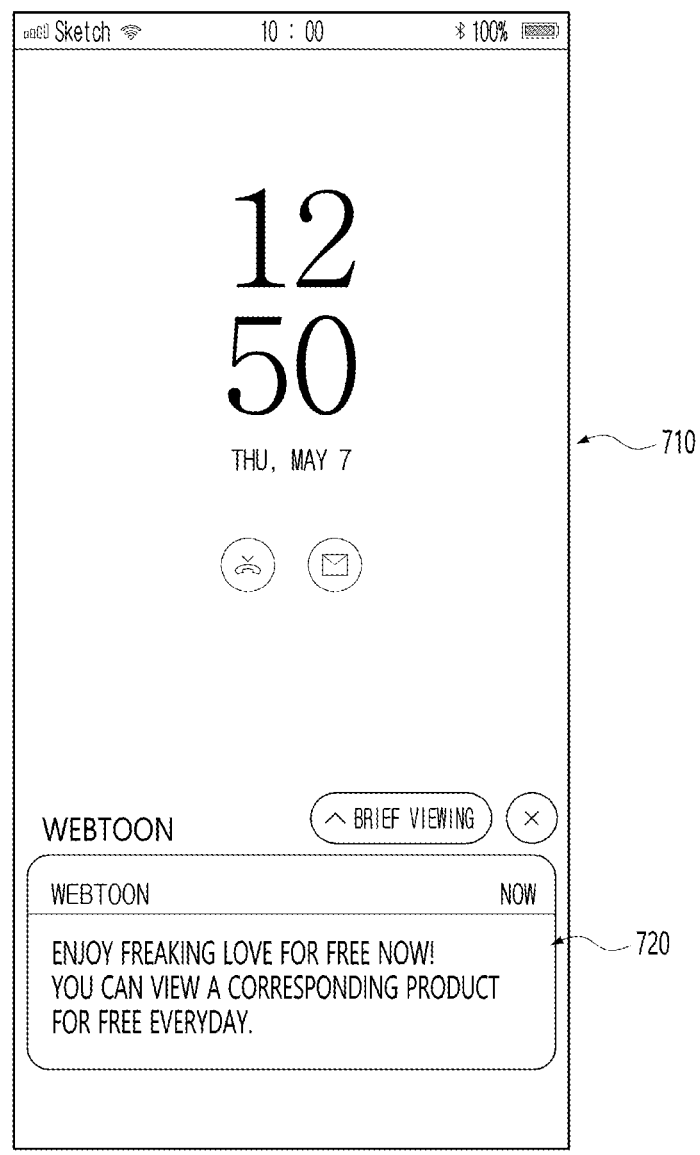
FIG. 3C is a conceptual view for explaining a method for providing notification information on a viewing right, in a method and system for providing contents according to the present disclosure.

Hereinafter, a charged episode viewing right and a charged episode providing method using a charge episode viewing right will be explained in more detail, with reference to the attached drawings. FIGS. 3A and 3B are conceptual views for explaining a method for specifying contents for which a charged episode viewing right can be used, in a method and a system for providing contents according to the present disclosure. FIG. 3C is a conceptual view for explaining a method for providing notification information on a viewing right, in a method and a system for providing contents according to the present disclosure.

In the contents providing system 100 according to the present disclosure, a charged episode viewing right for using (or viewing) a charged episode may be provided, without a user's purchase of a charged episode using electronic money.

The controller 130 may allocate a charged episode viewing right to a user account. A user can view a charged episode through the charged episode viewing right allocated to his or her account.

Here, the controller 130 may allocate a charged episode viewing right per preset time period, in order to obtain steady viewers (readers) of contents. The controller 130 may allocate a charged episode viewing right to a user account, per preset time period.

For instance, the controller 130 may allocate a charged episode viewing right per time period of 24 hours. In this case, a user can be provided with a charged episode viewing right per time period of 24 hours, and can view a charged episode by using the provided charged episode viewing right.

Here, the time period of the allocation of the charged episode viewing right may be set variously, and a time of the allocation of the charged episode viewing right may be also set variously (e.g., per 9 o'clock am, or per 10 o'clock am, etc.).

The controller 130 may set at least one of the time period and the time of the allocation of the charged episode viewing right, per user account.

For instance, the controller 130 may determine at least one of the time period and the time of the allocation of the charged episode viewing right, based on time information about main use of contents per user account.

More specifically, the controller 130 may monitor a time related to the main use of contents per user account, and may determine at least one of the time period and the time of the allocation of the charged episode viewing right, based on the monitored time information.

That is, the controller 130 may allocate a charged episode viewing right at a time when a user mainly uses contents, thereby enhancing the use rate of the charged episode viewing right. This results in increased consumption of the contents.

Alternatively, the controller 130 can allocate a charged episode viewing right to all users, at the same time period and at the same time.

The number of charged episode viewing rights allocated to a user account may be set variously. For instance, the controller 130 may provide (allocate) three charged episode viewing rights to a user account, per preset time period.

The controller 130 may differently set the number of charged episode viewing rights, according to a use frequency (the number of times of use) of a charged episode viewing right.

The controller 130 may monitor use frequency information of a charged episode viewing right, per user account. The controller 130 may provide a larger number of charged episode viewing rights to a user account having a high use frequency of a charged episode viewing right, than a user account having a low use frequency of a charged episode viewing right, based on the monitoring result.

In a case that a charged episode viewing right is allocated (or reallocated) to a user account, the controller 130 may provide notification information which informs the allocation (reallocation) of the charged episode viewing right, to the electronic device 101 used to log in to the user account. As shown in FIG. 3C, notification information 720 may be output to the electronic device 101. The notification information 720 may be output in various manners. As shown, the notification information 720 may be output through a pop-up window. The controller 130 may output the notification information to the electronic device 101 used to log in to a user account, in the form of a push message. As shown, the notification information 720 can be output to a lock screen 710 of the electronic device 101.

The controller 130 may provide notification information to the electronic device 101 per preset time period of allocation of a charged episode viewing right. For instance, in a case that a charged episode viewing right is allocated at 10 o'clock am every day, notification information which informs an allocated state of a charged episode viewing right may be output to the electronic device, at 10 o'clock am every day.

The controller 130 may include information about contents including episodes which have been viewed using a charged episode viewing right, to the notification information. As shown, the notification information 320 may include "FREAKING LOVE", the contents title (contents information). That is, in the present disclosure, information about contents which have been viewed by a user using a charged episode viewing right is provided to the notification information, thereby inducing the user to continuously use the charged episode viewing right for corresponding contents. That is, in the present disclosure, the use rate of contents may be enhanced by providing notification information together with information about user's interested contents.

As aforementioned, a charged episode viewing right may be provided (allocated) to a user account per preset time period. Here, in the present disclosure, in order to enhance the use rate of a charged episode viewing right, it may be set that a pre-allocated charged episode viewing right can be used only within a preset duration (or time).

For instance, in a case that charged episode viewing rights are allocated per preset time period, the controller 130 may control charged episode viewing rights not used for the preset time period, to disappear.

That is, the controller 130 may reallocate charged episode viewing rights per preset time period, without accumulating charged episode viewing rights not used for the preset time period.

For instance, in a case that "3" charged episode viewing rights are allocated per time period of 24 hours, the controller 130 may set the 3 allocated charged episode viewing rights to be usable only for 24 hours. If 24 hours lapse after the 3 charged episode viewing rights are allocated, the controller 130 may newly allocate 3 charged episode viewing rights without accumulating the 3 charged episode viewing rights, to a user account.

Thus, the user account may not have charged episode viewing rights more than 3. It is assumed that 3 charged episode viewing rights have been allocated to the user account at 10 o'clock am, Apr. 27, 2020, and then 2 charged episode viewing rights are used.

The controller 130 may allocate (reallocate) 3 charged episode viewing rights to the user account, at 10 o'clock am, Apr. 28, 2020. In this case, the user account has only 3 charged episode viewing rights. That is, the 1 charged episode viewing right not used at 10 o'clock am, Apr. 27, 2020 may disappear.

In this manner, the controller 130 may set a use term (or an expiration term) of a charged episode viewing right. For instance, the controller 130 may set a use term of a charged episode viewing right to a time when the next charged episode viewing right is provided. Thus, the controller 130 may allocate new charged episode viewing rights per preset time period, after charged episode viewing rights allocated at the previous time period disappear.

This is in order to induce a user to use (or read) contents continuously within a preset time period. Under this configuration, a user may have a psychological motivation to use contents by using a charged episode viewing right, before the charged episode viewing right which is to disappear after a predetermined time disappears. Consequently, in the method and system for providing contents of the present disclosure, a user may be induced to continuously consume contents within a preset time period.

The charged episode viewing right of the present disclosure may be understood as rental of a charged episode. For instance, the controller 130 may control a charged episode viewed with a charged episode viewing right, to be usable only for a predetermined time (or a preset time, e.g., 15 days) at a user account.

That is, the user account may use a charged episode rented through a charged episode viewing right, anytime for the preset time.

This may mean that a use term (or a reading term) of a charged episode is set.

In a case that the user account is to reuse a charged episode viewed through the charged episode viewing right after the predetermined time, the controller 130 may perform a payment process to pay electronic money, coupons or a viewing right, etc.

Under this configuration, in the method and system for providing contents of the present disclosure, a substantial reading of a charged episode may be performed within a predetermined time.

Information on a use term (or a rental term) of a charged episode rented through a charged episode viewing right may be displayed on an item of the corresponding charged episode, which will be explained later.

As aforementioned, in the method and a system for providing contents of the present disclosure, consumption of contents may be increased by allowing a user to easily access a charged episode through a charged episode viewing right.

Here, in the present disclosure, a charged episode viewing right may be usable only with respect to specific contents among various contents retained in a contents DB included in the storage unit 120.

That is, the controller 130 may allow a charged episode viewing right only with respect to specific contents which satisfy a preset condition.

Thus, in a case that specific contents of which viewing request has been received are contents which satisfy a preset condition and to which the charged episode viewing right has been allowed, the controller 130 may provide notification information including the remaining number of availability of the charged episode viewing right retained at the user account. The notification information may be output to the electronic device 101. The notification information may be output to a region of a display area on the electronic device 101, together with a plurality of items corresponding to a plurality of episodes which constitute specific contents. That is, the notification information may be output to the electronic device 101, together with a list of the plurality of items.

As aforementioned, a charged episode viewing right can be used only with respect to specific contents which satisfy a preset condition. Thus, the controller 130 may differently set a payment method with respect to a charged episode of which viewing has been requested, according to whether a charged episode viewing right has been allowed to the specific contents or not.

More specifically, if the charged episode is specific contents which satisfy the preset condition, the controller 130 may subtract charged episode viewing rights retained at a user account, and may provide the charged episode to an electronic device 101. In this case, it is assumed that the charged episode viewing rights are retained at the user account.

On the contrary, if the charged episode is not specific contents which satisfy the preset condition, the controller 130 may perform a payment process to pay electronic money, or a process to use other coupons, etc.

Specific contents to which a charged episode viewing right has been allowed are contents which satisfy a preset condition, and the condition may be set by the contents providing system 100 of the present disclosure.

For instance, as shown in FIG. 3A, the controller 130 may provide a condition setting screen 310 for setting conditions to each contents. The condition setting screen 310 is visual information and may also be referred to as condition setting information 310. The condition setting screen 310 may be displayed on the electronic device 101 (not shown).

On the condition setting screen 310, various conditions of contents may be set. For instance, on the condition setting screen 310, various conditions related to contents and a charged episode viewing right can be set, for example, i) a charged sale starting date of contents, ii) a charged sale starting number (or a charged sale starting episode), iii) a sale price, iv) whether a charged episode viewing right is available or not, v) a use starting date of a charged episode viewing right, vi) a use ending date of a charged episode viewing right, vii) the number of times of availability (usability) of a charged episode viewing right (or the number of times of availability (usability) of one-day charged episode viewing right, and viii) a providing time of a charged episode viewing right.

Further, as shown in FIG. 3B, a condition setting screen 320 may provide a user interface (a user environment) to select one of a plurality of episodes, the one episode for which a charged episode viewing right is to be used. The condition setting screen 320 is visual information and may also be referred to as condition setting information 320. The condition setting screen 320 may be displayed on the electronic device 101 (not shown).

For instance, as shown in FIG. 3B, if an item 321 of "Ep5" (a fifth episode) is selected by users (for example, managers who manage the system according to the present invention), etc., the controller 130 may control a charged episode viewing right to be usable with respect to the fifth episode item. In this case, if other episode except for the fifth episode is selected, the controller 130 may perform a payment process to pay electronic money, or a process to use other coupons, etc.

Thus, the controller 130 may control a charged episode viewing right to be used only with respect to specific contents which have been set to allow use of the charged episode viewing right, through the aforementioned condition setting screen 310.

The controller 130 may control a charged episode viewing right to be used only with respect to contents which satisfy a preset condition, among a plurality of contents retained at a contents DB. In this case, the aforementioned setting related to a charged episode viewing right, on the condition setting screens 310, 320, may be performed only with respect to contents which satisfy a preset condition.

Here, the preset condition may be determined based on quantitative information related to consumption of contents, such as a sale amount of contents, the number of times of reading and the number of times of viewing.

The controller 130 may control contents such that a charged episode viewing right is used only with respect to contents which satisfy a preset quantitative condition.

As aforementioned, in the contents providing system 100 of the present disclosure, various options related to a charged episode may be set.

Hereinafter, a method for providing information related to use of a charged episode viewing right to specific contents which have been set to allow use of the aforementioned 'charged episode viewing right', and a method for using a charged episode viewing right will be explained in more detail with reference to the attached drawings. FIG. 4, FIGS. 5A to 5E, and FIG. 6 are conceptual views for explaining a viewing right which enables viewing a charged episode, in a method and a system for providing contents according to the present disclosure, and FIGS. 7A to 7C are conceptual views for explaining a method for guiding information on a time to convert charged contents into free contents, in a method and a system for providing contents according to the present disclosure.

Hereinafter, contents which have been set to allow use of a charged episode viewing right will be explained with an example. Firstly, the controller 130 of the present disclosure may provide a screen shown in FIG. 4A.

Figure 4A:

When a user's' request to view specific contents is received, the controller 130 may provide a contents entering screen (or a 'screen') 410 for selecting at least one of a plurality of episodes which constitute the specific contents, as shown in FIG. 4A.

As shown in FIG. 4A, the contents entering screen 410 may include a first region 420 for outputting notification information related to a charged episode viewing right, and a second region 430 having a list of a plurality of episodes which constitute specific contents.

The list may include a plurality of items corresponding to a plurality of episodes.

As shown, the contents entering screen 410 may further include an additional region having information related to specific contents (e.g., a title, a storyline, etc.).

The contents entering screen 410 may be output to an electronic device 101 through an application, a web browser, etc. A series of processes by the contents providing system 100 of the present disclosure may be performed through an application. In this case, the application may perform at least a part of the aforementioned functions performed by the contents providing system 100.

The first region 420 for outputting notification information related to a charged episode viewing right, included in the contents entering screen 410 will be explained in more detail.

The configuration of the first region 420 is merely exemplary, and can be modified in various manners. The first region 420 may be output to electronic device 101 in a fixed manner, regardless of scrolling of the list of the second region 430. That is, the controller 130 may allow the list included in the second region 430 to scroll, without changing an output position of the first region 420.

Figure 4B:
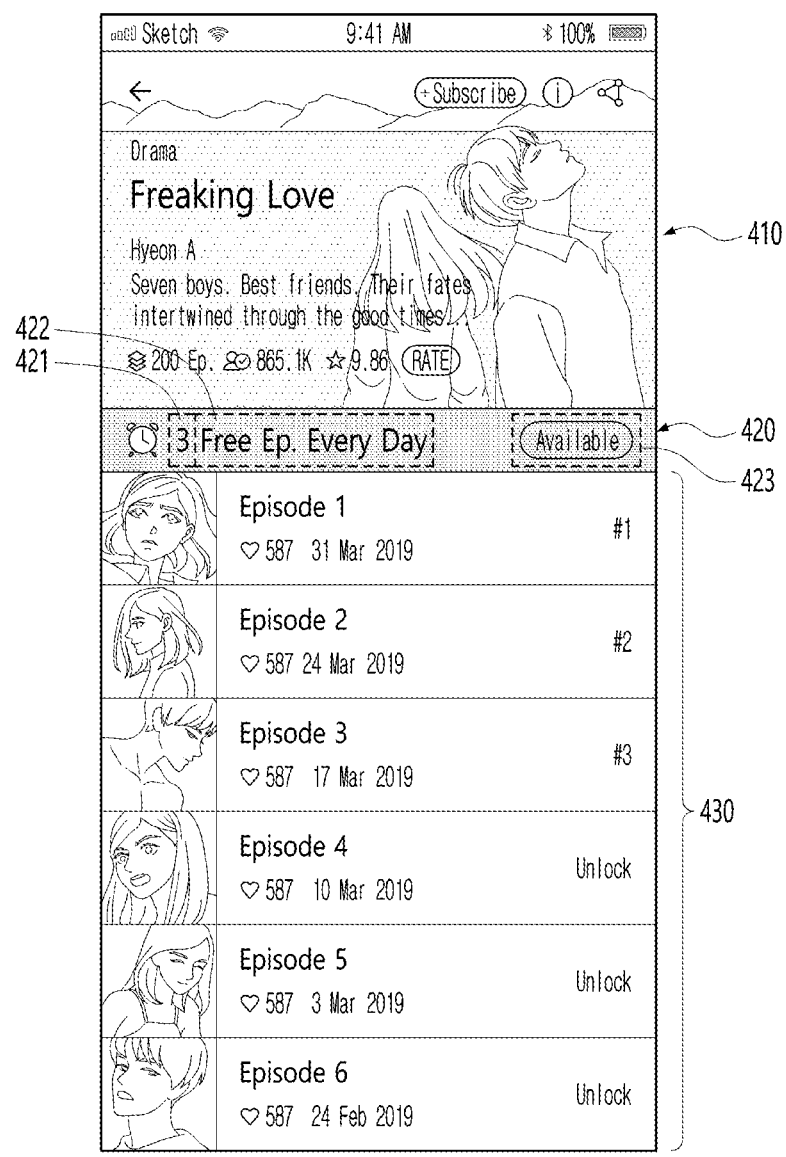

As shown in FIG. 4B, information on a charged episode viewing right retained at a user account may be output to the first region 420.

Here, the information on a charged episode viewing right may include at least one of i) information 421 on the number of charged episode viewing rights retained at a user account (or the number of times of availability of charged episode viewing rights, ii) information 422 on an attribute of a charged episode viewing right, and iii) information 423 on a current available state of a charged episode viewing right (e.g., "available" when it is usable).

The information 422 on an attribute of a charged episode viewing right may include at least one of i) information on the remaining number of charged episode viewing rights (or information on the remaining number of times of availability of charged episode viewing rights), and ii) information on the number of charged episode viewing rights per preset time period (e.g., everyday (24 hours)), such as "free ep. everyday" ("n" episodes are free everyday) indicated by 422 of FIG. 4B.

In a case that a request to view a charged episode is received from the electronic device 101, the controller 130 may determine whether a charged episode viewing right exists at a user account. If a charged episode viewing right exists at a user account, the controller 130 may process the charged episode viewing right retained at the user account for use, and may provide a charged episode to the electronic device 101.

The controller 130 may subtract the number of times of availability of the charged episode viewing right allocated to the user account, based on the provision of the charged episode. In this case, the controller 130 may update the notification information output to the first region 420, based on the subtraction of the number of times of availability of the charged episode viewing right.

That is, notification information related to a charged episode viewing right retained at a user account may be updated based on subtraction of the number of times of availability of the charged episode viewing right, and the first region 420 for outputting the notification information related to the charged episode viewing right may be also updated by interworking with the update of the notification information.

Figure 4C:
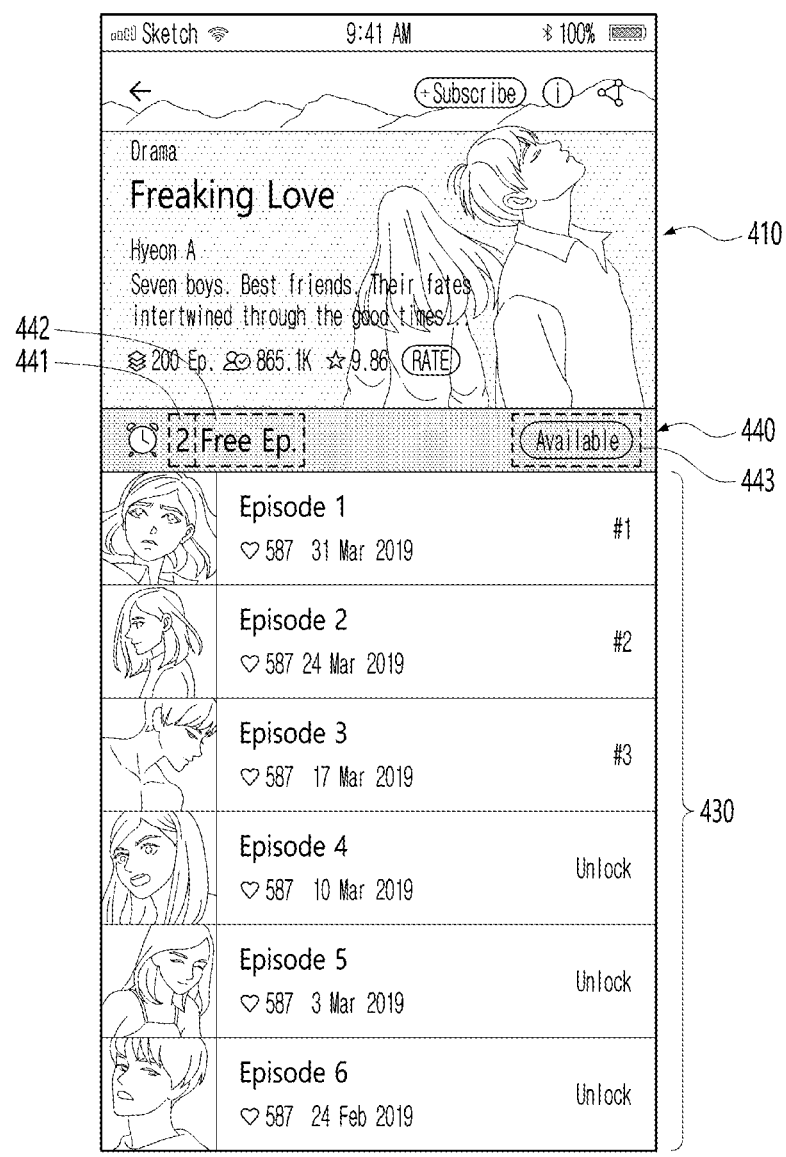

For instance, as shown in FIG. 4B, if one charged episode viewing right is used at a user account having the conventional 3 charged episode viewing rights, the controller 130 may subtract the number of times of availability of the charged episode viewing rights with respect to the user account by one time. Thus, as shown in FIG. 4C, the notification information related to the charged episode viewing rights retained at the user account may be changed from the conventional "3" (421 in FIG. 4B) into "2" (441), as the number of times of availability of the charged episode viewing rights is subtracted by one time.

The controller 130 may display the remaining number of charged episode viewing rights (or the number of times of availability of charged episode viewing rights), based on use of the charged episode viewing rights retained at the user account.

Figure 4D:
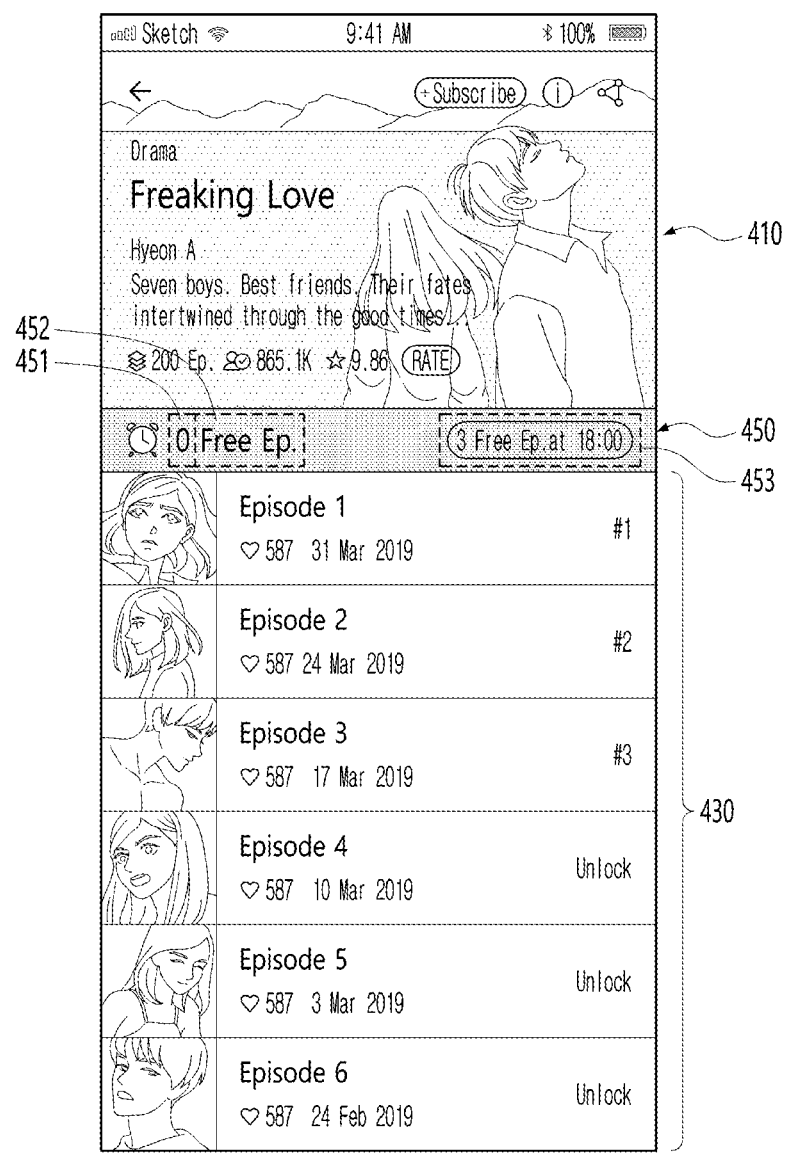

As shown in FIG. 4D, if the charged episode viewing rights retained at the user account are used up, that is, if the number of times of availability of the charged episode viewing rights is "0" (451), the controller 130 may provide information 453 on an allocation time of the next charged episode viewing right.

The controller 130 may output information on the current available state of a charged episode viewing right. If a charged episode viewing right is currently available, the controller 130 may output i) information 423, 443 (refer to FIGS. 4B and 4C) indicating that a charged episode viewing right is currently available, e.g., "available". If a charged episode viewing right is currently unavailable, the controller 130 may output information 453 on an allocation time of the next charged episode viewing right, as shown in FIG. 4D.

That is, in a case that the number of times of availability of charged episode viewing rights is subtracted and the remaining number of times of availability of the charged episode viewing rights is '0' due to use of the charged episode viewing rights, the controller 130 may provide time information related to an allocation time of the next charged episode viewing right. That is, notification information related to charged episode viewing rights retained at a user account may be updated based on a complete subtraction ('0') of the number of times of availability of the charged episode viewing rights. The first region 420 for outputting the notification information related to the charged episode viewing rights may be also updated by interworking with the update of the notification information.

Under this configuration, a user may intuitively check information on an available state of a charged episode viewing right, and information on an available state of the next charged episode viewing right.

In the present disclosure, information on the current state of each episode may be provided through items corresponding to a plurality of episodes.

Here, the information on the current state of an episode may include at least one of i) information on a product type of an episode (a charged product type or a free product type), ii) information on a charged episode use term, in the case of an episode using a charged episode viewing right, iii) information on a sale price of a charged episode, iv) information on whether a use history of a charged episode viewing right exists or not, and v) information indicating a purchased state of a charged episode.

The controller 130 may output corresponding current state information among the aforementioned various current state information of each episode, in each item corresponding to each episode. That is, the controller 130 may output a graphic object including current state information of a corresponding episode, to each item corresponding to each episode.

Figure 5A:

The controller 130 may display different information on each episode item according to an episode product type, thereby providing a user with information on an episode product type. For instance, as shown in FIG. 5A, the controller 130 may output first information 514("#") in an item 511 corresponding to an episode of a free product type, and may include second information 513 ("unlock", release of a locked state) different from the first information in an item 512 corresponding to an episode of a charged product type, the item 512 which can be used with a charged episode viewing right. (Various visual information according to the present invention may be output to a display unit (or a display screen) of the electronic device 101.)

The controller 130 may output a graphic object indicating that a charged episode viewing right allocated to the specific user account is available, in a region of an item corresponding to a charged episode.

Figure 5B:

Further, as shown in FIG. 5B, the controller 130 may output third information 552 different from the first information 514 and the second information 513, in an item 551 corresponding to an episode of a charged product type which cannot be used with a charged episode viewing right. Here, the third information may include information on the amount of money (or electronic money information, e.g., 5 coins) which can purchase a corresponding charged episode.

Figure 5C:

Further, as shown in FIG. 5C, the controller 130 may output history information to an episode which has been purchased or which has been rented through a charged episode viewing right, at a user account. As shown, "used" 542 may be displayed at one region of an item 541 corresponding to an episode which has a history of a purchase or a rental, as history information.

The history information may be modified in various manners. For instance, as the history information, "purchased" may be displayed on an episode which has a purchase history of being purchased with electronic money. The controller 130 may control an episode which has been purchased with electronic money, to be re-viewable anytime without repurchase.

A charged episode viewing right in the present disclosure may be understood as a concept to rent a charged episode. For instance, the controller 130 may control a charged episode viewed through a charged episode viewing right, to be available only for a predetermined time period (or a preset time, e.g., 15 days), at a user account which has used the charged episode viewing right. That is, a charged episode rented through a charged episode viewing right is available anytime for the predetermined time period, at the user account.

This may mean that a use term (or a reading term) of a charged episode is preset.

In the case of reusing the charged episode which has been used through the charged episode viewing right after the predetermined time period at the user account, the controller 130 controls the electronic device 101 to perform a payment process to pay electronic money, a coupon, a viewing right, etc.

Under this configuration, in the method and system for providing contents of the present disclosure, a substantial reading (subscription) of a charged episode may be performed within a predetermined time.

Information on a use term (or a rental term) of a charged episode rented through a charged episode viewing right may be displayed on an item of the corresponding charged episode.

Figure 5D:
Figure 5E:

For instance, as shown in FIGS. 5D and 5E, items 521 (FIG. 5D) and 531 (FIG. 5E) each corresponding to a charged episode rented through a charged episode viewing right may include information on an available time of the corresponding episode through the charged episode viewing right.

That is, the items 521 (FIG. 5D) and 531 (FIG. 5E) each corresponding to a charged episode rented through a charged episode viewing right may include graphic objects 522 (FIG. 5D) and 532 (FIG. 5E). Such graphic objects may include guide information for guiding a term (or a time) for which the charged episode can be viewed (or used) through the charged episode viewing right.

For instance, as shown in FIG. 5D, if a remaining use term of the charged episode viewing right is one day, information of "1 day(s) left" may be output to the corresponding item 521. And as shown in FIG. 5E, if the remaining use term of the charged episode viewing right is 23 hours and 59 minutes, information of "23:59 left" may be output to the corresponding item 531.

The controller 130 may display time information in a different manner, according to a remaining time corresponding to a use term of the charged episode viewing right.

For instance, as shown in FIG. 6, the controller 130 may display, on a display unit (or a display screen) of the electronic device 101, information on a use term of the charged episode viewing right, based on a preset time condition.

If the remaining use term of the charged episode viewing right is 24 hours or more, the controller 130 may provide "information on the number of remaining days", as information of a use term of the charged episode viewing right. In this case, as shown in FIG. 5D, information of "1 day(s) left" 522 may be output to the item 521 corresponding to an episode for which the charged episode viewing right has been used, as information on the number of remaining days.

In contrast, if the remaining use term of the charged episode viewing right is less than 24 hours, the controller 130 may provide "information on a remaining time", as information of a use term of the charged episode viewing right. In this case, as shown in FIG. 5E, information of "23:59 left" 532 may be output to the item 531 corresponding to an episode for which the charged episode viewing right has been used, as information on a remaining time.

If a use term of a charged episode viewing right expires, as shown in FIGS. 5A to 5C, at least one of i) information on the sale price of a charged episode, ii) information indicating that a charged episode viewing right is available, and iii) history information indicating that a charged episode viewing right has been previously used, may be output to an item corresponding to a corresponding charged episode. The controller 130 may output proper information according to the current state of a corresponding charged episode (e.g., whether a charged episode viewing right is available or not, etc.).

As aforementioned, in the method and system for providing contents according to the present disclosure, state information of a corresponding episode may be displayed on each item corresponding to each episode. Thus, a user may intuitively predict a process which is to be performed when using a corresponding episode, only based on information included in an item corresponding to the episode.

In the present disclosure, when a user is to use a charged episode viewing right or is to pay electronic money with respect to a charged episode, information on the time when the corresponding charged episode is converted into a free episode may be provided.

More specifically, if a time when a charged episode product type is converted into a free episode product type is within a preset time, the controller 130 may provide, to the electronic device 101, notification information (guide information) indicating the conversion time of the product type of the specific episode, before subtracting the number of times of availability of a charged episode viewing right, or before paying electronic money.

That is, in the present disclosure, notification information may be provided in order to prevent a user from unnecessarily consuming a charged episode.

For instance, if a charged episode item 711 which can be used with a 'charged episode viewing right' is selected from an electronic device as shown in FIG. 7A, the controller 130 may output notification information indicating that the charged episode item 711 is converted into a free product type after a predetermined time (e.g., 14 days), (e.g., "This episode is converted into a free product type after 14 days. Do you really want to read now?") as shown in FIG. 7B.

Further, if a request to view a charged episode is received from a user account (or the electronic device 101) (e.g., an icon of "unlock" is selected on the electronic device 101), the controller 130 may subtract the number of times of availability of a charged episode viewing right allocated to the user account, and may provide a charged episode.

In this case, as shown in FIG. 7C, it may be checked, from current state information of the charged episode viewing right, that the number of times of availability of the charged episode viewing right was subtracted ("3 free ep." before use of the charged episode viewing right is changed into "2 free ep." after use of the charged episode viewing right).

Further, information 732 on a use term of the charged episode viewing right ("14 days left") may be output to an item 731 corresponding to an episode for which the charged episode viewing right has been used.

Further, as shown in FIG. 7B, the controller 130 may additionally provide information on a method for viewing the remaining episodes, to notification information 721. For instance, as shown, the controller 130 may additionally provide information indicating that a payment using electronic money is required to use all of the remaining episodes, such as "All of the remaining episodes can be unlocked by a coin payment.".

Even in the case of purchasing a charged episode by using electronic money, the controller 130 may provide information on a time to convert a charged episode into a free episode, in a similar manner to the aforementioned method.

Figure 7E:
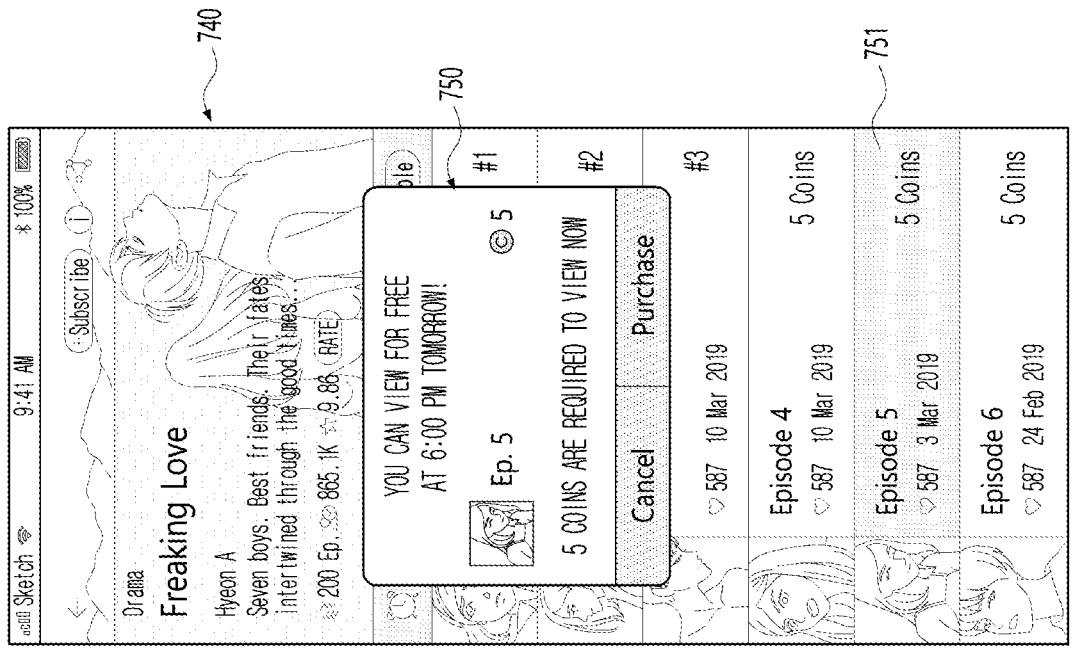
Figure 7D:
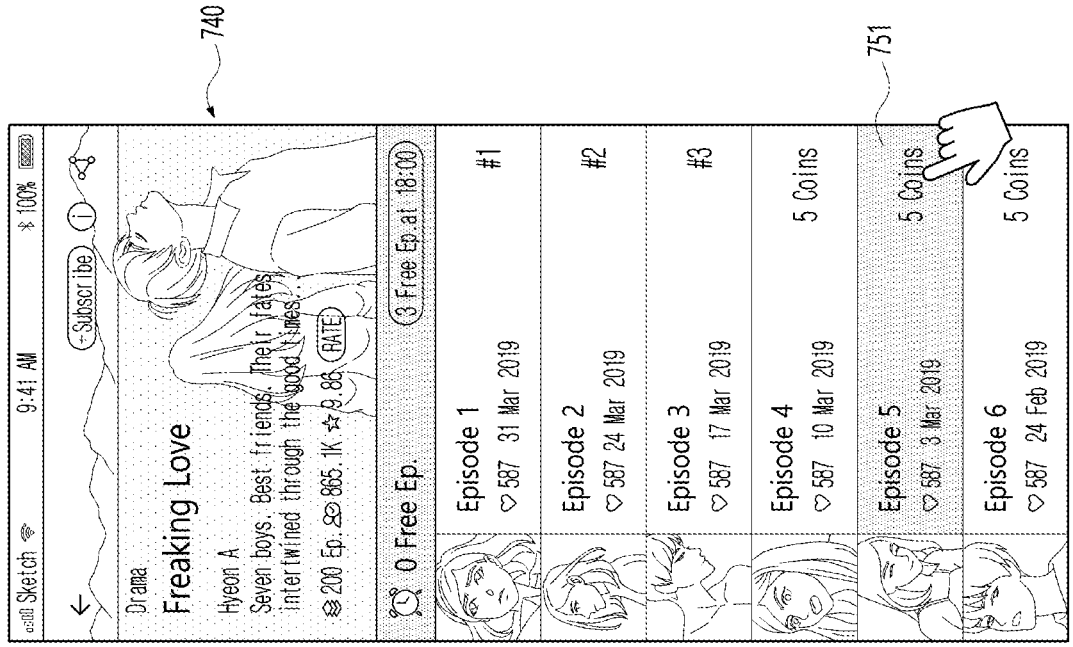

For instance, as shown in FIG. 7D, if a charged episode item 751 requiring a payment of electronic money is selected from the electronic device 101, the controller 130 may output notification information indicating that the charged episode item 751 is converted into a free product type after a predetermined time (e.g., 6 o'clock pm tomorrow) (e.g., "A free viewing is available at 6 o'clock pm tomorrow!") as shown in FIG. 7E.

If a request to view a charged episode is received from a user account (or the electronic device 101) (e.g., an icon of "purchase" is selected from the electronic device 101), the controller 130 may subtract electronic money retained at the user account, and may provide the charged episode.

That is, the electronic money retained at the user account may be paid for purchase of the charged episode. Although not shown, if the electronic money retained at the user account is not sufficient to pay for the purchase of the charged episode, the controller 130 may perform an additional process for charging the electronic money or purchasing electronic money.

Figure 7F:
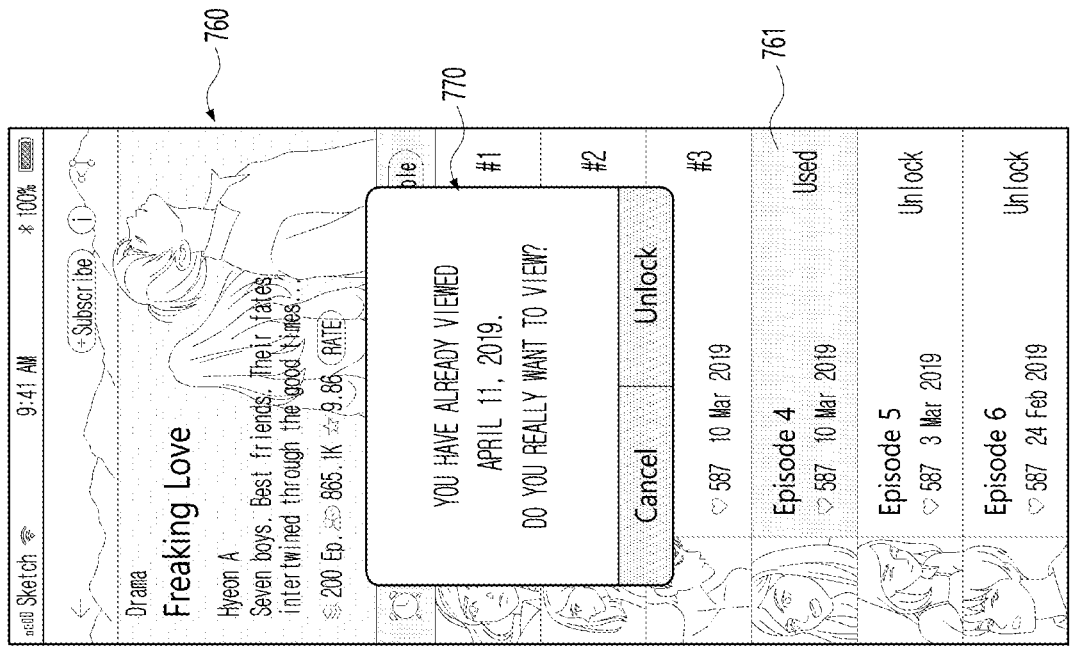
Figure 7G:
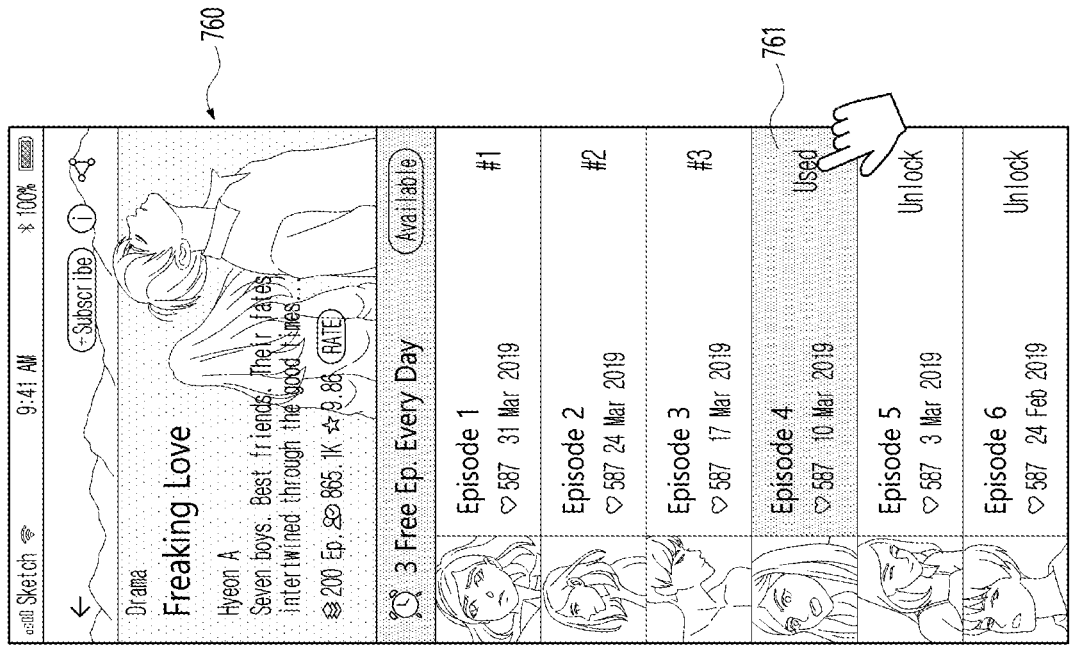

Further, as shown in FIG. 7F, if a request to repurchase or view an episode which has been previously rented through a charged episode viewing right or purchased is received from a user account, the controller 130 may inform a user of a previous history of purchase or rent through notification information 770, as shown in FIG. 7G.

As shown in FIG. 7F, if an item 761 corresponding to an episode which has a previous history of purchase or rent is selected from the electronic device 101, the controller 130 may provide notification information 770 as shown in FIG. 7G.

The notification information 770 may include information indicating that the episode corresponding to the selected item 761 has been previously purchased or rented (e.g., "You've already viewed on Apr. 11, 2019. Do you really want to view?").

Then, if a request to purchase or rent the corresponding item 761 is received from the electronic device 101, the controller 130 may perform a process of purchasing or renting the episode corresponding to the item 761, and then may provide the episode corresponding to the item 761 to the electronic device.

As aforementioned, in the method and system for providing contents according to the present disclosure, when a user is to purchase charged contents, information on a time when the charged contents are converted into free contents is provided. This may prevent the user from unnecessarily consuming the charged contents.

In the method and system for providing contents according to the present disclosure, there may be provided a sale method for allowing a user to purchase a plurality of episodes more cheaply than a single episode, in order to induce purchase of charged episodes. This will be explained in more detail with reference to the attached drawings.

Figure 8B:
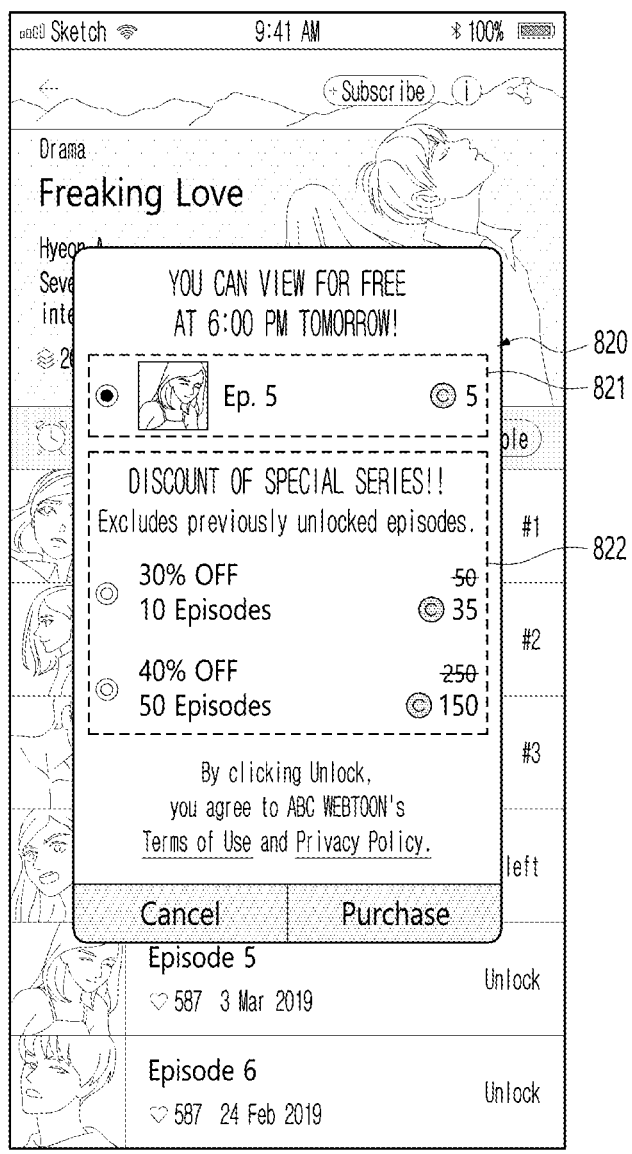

FIGS. 8A and 8B are conceptual views for explaining a method for inducing a user to consume more economically at the time of purchasing charged contents, in a method and system for providing contents according to the present disclosure.

More specifically, the controller 130 may provide a payment process for a sale in a "bundle" by grouping a plurality of charged episodes.

As shown in FIG. 8A, on a condition setting screen 330 for setting sale conditions of contents, various options related to a "bundle" sale may be set, such as i) the number of episodes to be grouped for a sale (e.g., correspondence to a "bundle unit" item), and ii) how many discount rates will be applied at the time of a bundle sale (e.g., correspondence to a "discount rate" item). The condition setting screen 330 is visual information and may also be referred to as condition setting information 330. The condition setting screen 330 may be displayed on the electronic device 101 (not shown).

Such options may be selected by a manager, etc., and the controller 130 may set a bundle sale option of contents based on the selection.

After a bundle sale option to sell episodes in a bundle is set, if a request to purchase contents is received from the electronic device 101, the controller 130 may output sale information 822 corresponding to a preset sale condition (or a bundle sale condition), as shown in FIG. 8B.

As shown, the controller 130 may output each sale option according to the preset bundle sale option. For instance, episode sale information 820 may include sale price information of each option. For instance, the sale price information may have i) 1 episode is 5 coins (821), ii) 10 episodes are 35 coins by discount of 30%, and iii) 50 episodes are 150 coins by discount of 40%. The controller 130 may output at least one of the number of episodes to be sold in a bundle, price information, and discount rate information, to the sale information.

Thus, a user may use contents more economically through a bundle purchase when he or she wishes to continuously read the contents.

In a case that one purchase option is selected on the sale information 820, the controller 130 may provide a payment process to pay the price corresponding to the selected purchase option.

The controller 130 may additionally provide information on a bundle sale option, based on a request to view a single episode. For instance, as shown in FIG. 7D, based on a selection of an item 751 corresponding to a charged episode, the controller 130 may provide notification information including information on the sale option, to an electronic device.

In the present disclosure, a user may be induced to purchase episodes economically by selecting a bundle sale option with respect to a plurality of episodes.

The aforementioned contents providing method may be provided through an application installed on the electronic device 101. Such an application may perform a series of processes illustrated in the flowchart of FIG. 2.

For instance, an application installed on the electronic device 101 may receive a selection of specific contents through an execution screen of the application, the execution screen outputted to the electronic device. Then, the application may output a plurality of items corresponding to a plurality of episodes included in the specific contents, to the electronic device based on the selection of the specific contents.

Here, the execution screen is visual information displayed on a display unit (or a display screen) of the electronic device 101.

As aforementioned, in the outputting of the plurality of items, notification information related to a charged episode viewing right which enables viewing of charged episodes among the plurality of episodes may be output together.

Also, as aforementioned, the information on the charged episode viewing right may include the remaining number of times of availability of the charged episode viewing right retained at a user account which has been logged in through the electronic device.

Further, in a case that a specific item corresponding to a charged episode among the plurality of items is selected, the application may provide the episode corresponding to the specific item. In this case, the remaining number of times of availability, included in the notification information may be changed based on the provision of the episode corresponding to the specific item, as aforementioned.

The application which performs such processes may include at least one of the components of the contents providing system 100 of FIG. 1. More specifically, instructions included in the application may perform the functions of the components of the contents providing system 100 of FIG. 1 described above.

In this case, a controller of the application may partially serve as the controller 130 of the contents providing system 100, by receiving contents-related information and user information through communications with the contents providing system 100.

Especially, the controller of the application may control the electronic device where the application has been installed, such that a screen corresponding to the aforementioned various functions related to a contents provision (e.g., a function related to a charged episode viewing right, etc.) is provided on the electronic device. More specifically, instructions included in the application may perform the functions of the controller.

As aforementioned, in the method and system for providing contents according to the present disclosure, a viewing right for viewing charged contents may be allocated to a user account. A user who has received such a viewing right may view charged contents by using the viewing right. This may prevent the user from unnecessarily paying for the charged contents.

In the method and system for providing contents according to the present disclosure, a viewing right is set to be available only within a preset time based on an allocation time of the viewing right. This may induce a user to consume charged contents by using the viewing right within the preset time.

In the method and system for providing contents according to the present disclosure, since a viewing right is reallocated per preset time period, a user may consume charged contents within a preset time, and may be induced to continuously consume the charged contents through the reallocated viewing right. Consequently, in the method and system for providing contents according to the present disclosure, a user who can consume contents steadily can be obtained, through a viewing right allocated per preset time period and available only within a preset time.

Further, in the method and system for providing contents according to the present disclosure, when a viewing right is reallocated, information on contents which have been previously viewed by a user is provided to the user. This may effectively induce the user to consume contents.

In the method and system for providing contents according to the present disclosure, when a user is to purchase charged contents, information on time when the charged contents are converted into free contents is provided. This may prevent the user from unnecessarily consuming the charged contents.

The configurations and methods of the mobile terminal in the aforesaid embodiments may not be limitedly applied, but such embodiments may be configured by a selective combination of all or part of the embodiments so as to implement many variations.

The present disclosure can be implemented as computer-readable codes in a program-recorded medium. The computer-readable medium may include all types of recording media each storing data readable by a computer system.

Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). It should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for providing contents, comprising:
receiving, by a processor, a request to view specific contents, from an electronic device;
providing, by the processor, a plurality of items corresponding to a plurality of episodes included in the specific contents, in response to the request; and
performing, by the processor, one of a first process and a second process, related to a provision of a specific episode, according to whether a product type of the specific episode is a free product type or a charged product type, in response to a selection of one of the plurality of items through the electronic device,
wherein the first process is performed when the specific episode has the free product type, and includes providing the specific episode to the electronic device, and
wherein the second process is performed when the specific episode has the charged product type and includes determining whether a specific user account which has been logged in through the electronic device has a viewing right with respect to the specific episode,
wherein a number of charged episode viewing rights to the specific episode are provided to the specific user account,
wherein a charged episode viewing right of the number of charged episode viewing rights to the specific episode is allocated for a preset time period to the specific user account, and a use term for the charged episode viewing right is set, the use term limiting the use of the charged episode viewing right to the preset time period,
wherein the preset time period of the use term is set to a time when the next charged episode viewing right of the number of charged episode viewing rights, is provided, and
wherein a new charged episode viewing right of the number of charged episode viewing rights is reallocated for another preset time period to the specific user account after the charged episode viewing right allocated at the previous time period disappears.

2. The method of claim 1,
wherein the first process is performed to provide the specific episode to the electronic device, without determining whether the specific user account has a viewing right with respect to the specific episode.

3. The method of claim 2, wherein a graphic object indicating that the charged episode viewing right allocated to the specific user account is available is included in one region of an item corresponding to at least one charged episode of a charged product type, among the plurality of items.

4. The method of claim 2,
wherein the second process further includes a process of providing the specific episode to the electronic device, in a case that the specific user account has a viewing right with respect to the specific episode.

5. The method of claim 4, wherein the second process further includes a process of subtracting a number of the charged episode viewing rights allocated to the specific user account, based on the provision of the specific episode.

6. The method of claim 5, wherein the charged episode viewing right is available only with respect to contents corresponding to a preset condition, and
wherein at the second process, the number of the charged episode viewing rights is subtracted when the specific contents are contents corresponding to the preset condition, and
wherein electronic money retained at the specific user account is paid when the specific contents are not contents corresponding to the preset condition.

7. The method of claim 6, wherein the second process further includes a process of providing notification information on a conversion time of a product type of the specific episode in a case that a time when a preset charged product type of the specific episode is converted into a free product type is within a preset time, before subtracting the number of the charged episode viewing rights, or before paying the electronic money.

8. The method of claim 5, wherein the charged episode viewing right is available only with respect to contents corresponding to a preset condition,
wherein the method further comprises providing, by the processor, notification information including information on a remaining number of the charged episode viewing rights retained at the user account, in a case that the specific contents are contents corresponding to the preset condition, and
wherein the notification information is output to one region of a display screen on the electronic device together with the plurality of items.

9. The method of claim 8, further comprising updating, by the processor, the notification information output to the one region of the display screen on electronic device, based on a subtraction of the number of the charged episode viewing rights.

10. The method of claim 9, wherein when the remaining number the charged episode viewing rights is '0' based on the subtraction of the number of the charged episode viewing rights, the notification information is updated to include time information related to a reallocation time of the charged episode viewing right.

11. The method of claim 1, further comprising providing, by the processor, notification information indicating the reallocation of the charged episode viewing right to the electronic device through which the specific user account has been logged in, in a case that the charged episode viewing right is reallocated to the specific user account,
wherein the notification information is provided to the electronic device at the preset time period.

12. The method of claim 11, wherein the notification information includes information on contents including an episode which has been previously viewed with the charged episode viewing right.

13. A system for providing contents, comprising:
a communication unit configured to receive a selection request for specific contents, from an electronic device;
a storage unit configured to store a plurality of episodes included in the specific contents; and
a processor configured to control the communication unit such that a plurality of items corresponding to the plurality of episodes are provided to the electronic device, in response to the selection request, wherein the processor performs one of a first process and a second process, related to a provision of a specific episode, according to whether a product type of the specific episode is a free product type or a charged product type, in response to a selection of one of the plurality of items through the electronic device, wherein the first process is performed when the specific episode has the free product type and includes providing the specific episode to the electronic device, and wherein the second process is performed when the specific episode has the charged product type and includes determining whether a specific user account which has logged-in the electronic device has a viewing right with respect to the specific episode, wherein a number of charged episode viewing rights to the specific episode are provided to the specific user account;

wherein a charged episode viewing right of the number of charged episode viewing rights to the specific episode is allocated for a preset time period to the specific user account, and a use term for the charged episode viewing right is set, the use term limiting the use of the charged episode viewing right to the preset time period, wherein the preset time period of the use term is set to a time when the next charged episode viewing right of the number of charged episode viewing rights, is provided, and wherein a new charged episode viewing right of the number of charged episode viewing rights is reallocated for another preset time period to the specific user account after the charged episode viewing right allocated at the previous time period disappears.

14. A method for providing contents, using an application executed on an electronic device, the method comprising:

selecting specific contents through an execution screen of the application, the execution screen outputted to the electronic device; and outputting a plurality of items corresponding to a plurality of episodes included in the specific contents, based on the selection of the specific contents, selecting specific episodes of the plurality of episodes:

wherein in the outputting of the plurality of items, notification information related to a charged episode viewing right associated with the specific episodes among the plurality of episodes is output together with the plurality of items, and wherein the notification information on the charged episode viewing right includes a remaining number of the charged episode viewing rights to the specific episodes retained at a user account which has been logged in through the electronic device, and wherein a new charged episode viewing right of the number of charged episode viewings rights is reallocated for a preset time period to the specific user account after the charged episode viewing right allocated at the previous time period disappears.

* * * * *